US012662328B2

(12) United States Patent　　　　(10) Patent No.:　US 12,662,328 B2

Pain Solano　　　　　　　　　　　　(45) Date of Patent:　　Jun. 23, 2026

(54) SYSTEM AND METHOD FOR AUTOMATICALLY GROUPING TUMBLED BRICKS

(71) Applicant: EQUIPCERAMIC, SA, Vilanova del Camí (ES)

(72) Inventor: Francisco Pain Solano, Igualada (ES)

( * ) Notice: Subject to any disclaimer, the term of this patent is extended or adjusted under 35 U.S.C. 154(b) by 0 days.

(21) Appl. No.: 18/967,080

(22) Filed: Dec. 3, 2024

(65) Prior Publication Data

US 2025/0187847 A1　　　Jun. 12, 2025

(30) Foreign Application Priority Data

Dec. 5, 2023　(EP) ..................................... 23383261

(51) Int. Cl.
　　*B65G 47/30*　　　　　(2006.01)
(52) U.S. Cl.
　　CPC .................................. *B65G 47/30* (2013.01)
(58) Field of Classification Search
　　CPC ........ B65G 47/30; B65G 43/08; B65G 43/10;
　　　　　　　B65G 47/086; B65G 47/24; B65G 47/29;
　　　　　　　　B65G 47/648; B65G 47/763; B65G
　　　　　　　　57/035; B65G 57/24; B65G 57/303;
　　　　　　　B65G 57/32; B65G 61/00; B65B 23/20;
　　　　　　　B65B 35/44; B65B 35/50; B65B 35/52;
　　　　　　　　B65B 35/56; B65B 35/58
　　See application file for complete search history.

(56) References Cited

U.S. PATENT DOCUMENTS 3,669,283　A　*　6/1972　Brown, Jr. ............. B65G 59/02
　　　　　　　　　　　　　　　　　　　　　　414/931
4,013,183　A　*　3/1977　Milholen ............... B65G 57/26
　　　　　　　　　　　　　　　　　　　　　　414/931

* cited by examiner

*Primary Examiner* — Lynn E Schwenning

(74) *Attorney, Agent, or Firm* — Eugenio J. Torres-Oyola; Victor M. Rodriguez Reyes; Rafael Rodriguez Muriel

(57)　　　　　　　ABSTRACT

System and method for automatically grouping tumbled bricks, comprising:

a brick feeding unit feeding rows of an even number of longitudinally spaced tumbled bricks with a featured side randomly positioned;

a detection unit detecting the featured side of each tumbled brick;

a pairing unit comprising a rotating device for each tumbled brick rotating each tumbled brick a preset angle in response of the detected position of the featured side, forming pairs of tumbled bricks with featured sides facing each other or in opposition;

a grouping unit grouping the pairs of tumbled bricks in compact formations;

a piling unit piling layers of compact formations in a compact pile of tumbled bricks, and a palettizing unit with pile rotation device rotating one compact pile of tumbled bricks 90° around a horizontal axis.

4 Claims, 4 Drawing Sheets

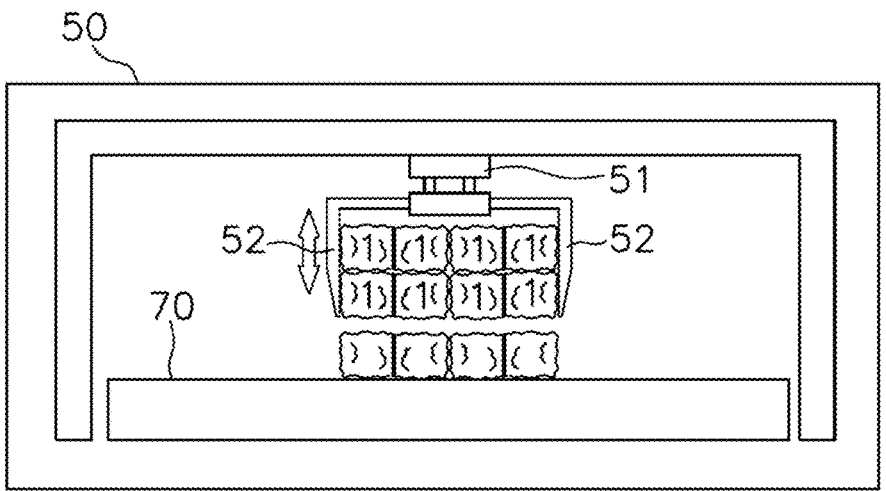
*Fig.6*
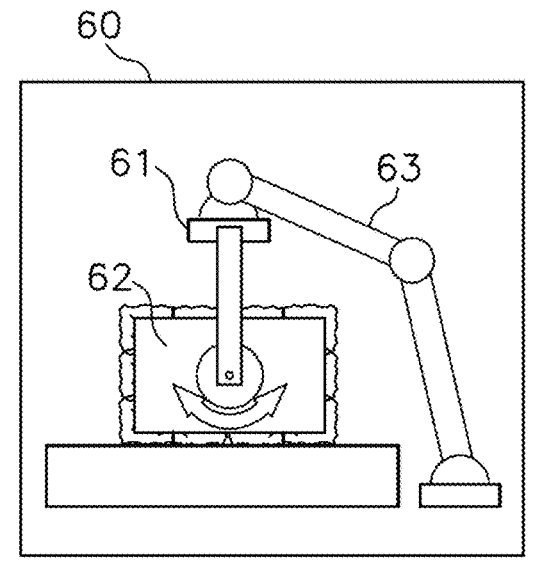
*Fig.7*
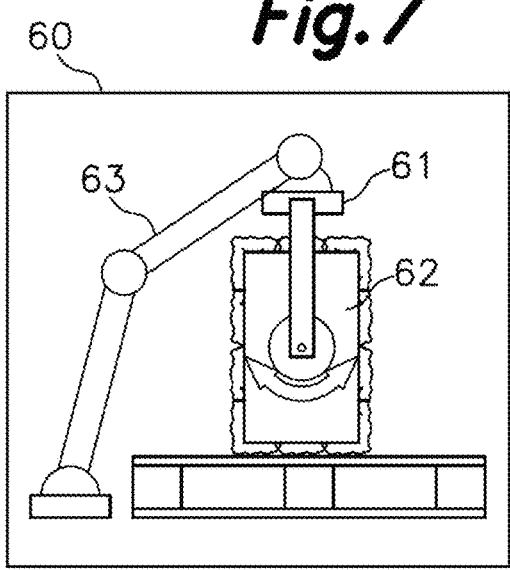
*Fig.8A*          *Fig.8B*

SYSTEM AND METHOD FOR AUTOMATICALLY GROUPING TUMBLED BRICKS

TECHNICAL FIELD

The present invention is directed towards a system and a method for automatically grouping tumbled bricks without the need of manual labour.

BACKGROUND OF THE INVENTION

Tumbled bricks are bricks that are artificially aged and as a result have irregular faces. Due to the irregular faces, tumbled bricks cannot be grouped, prepared for palletization as typical regular bricks that have regular faces. To create the tumbled finish, stock facing bricks are tumbled during the manufacturing process to batter the edges thereby creating a distressed looking brick.

Besides being irregular, tumbled bricks are unloaded from the tumbler in an irregular manner, usually in ununiform batches. As a result, nowadays tumbled bricks are manually grouped to be subsequently palletized by workers as grouping systems used in regular bricks are not suitable for use with tumbled bricks.

EP1455958-A1 discloses a sorting unit for bricks provided in a random order including a conveyor with a conveyor belt over the surface of which, between a receiving area for the bricks and a delivery area, there are mutually spaced guide bars disposed obliquely in relation to the direction of movement (F) of the conveyor, by which the bricks are guided in a row with the same orientation for subsequent pelletizing by machine.

CN106586490-A1 discloses an automatic code brick assembly line composed of a low-density conveyor belt, a high-density conveyor belt, a vertical and horizontal palletizing robot, and a pallet, wherein both the low-density conveyor belt and the high-density conveyor belt are driven by drive wheels.

The inventors are not aware of any system and method in the prior art that allows the performance proposed herein.

SUMMARY

In the following description, tumbled bricks are understood as bricks having a prismatic rectangular configuration with two main faces, two side faces and two end faces, one of the two main faces or one of the two side faces of each tumbled brick being one featured side, i.e. one side having differentiating features over the other sides of the tumbled brick, typically being a less tumbled side, a smoother side, a side including a coating, an engraving or any other distinguishing feature not present in the other sides of the brick.

The present invention concerns to a system for automatically grouping tumbled bricks, as defined in claim 1.

The invention comprises, in a manner known in the referred state of the art, a brick feeding unit configured to provide at a given point in time at least one row of tumbled bricks in aligned succession in a longitudinal direction, all the tumbled bricks resting on one main face or on one side face thereof.

This invention also proposes, in a manner not known, a system wherein the brick feeding unit provides each row of tumbled bricks with an even number of longitudinally spaced tumbled bricks with the featured side randomly positioned and a detection unit configured to automatically detecting the position of the featured side of each tumbled brick of each row of tumbled bricks.

The proposed system according to the invention further comprises:

a pairing unit to which said row/s of tumbled bricks with an even number of longitudinally spaced tumbled bricks are transferred, the pairing unit including a rotating device for each tumbled brick of the row of tumbled bricks configured to rotate each tumbled brick a preset angle selected in response of the detected position of the featured side of each tumbled brick, forming pairs of tumbled bricks with the corresponding featured sides facing each other or in opposition, and a grouping unit configured for grouping all the pairs tumbled bricks in at least one compact formation in a single layer.

The system may also include a piling unit configured for piling successive layers of compact formations of tumbled bricks coming from the grouping unit forming a compact pile of tumbled bricks by successively elevating layers of the compact formations through at least one vertical mover, inserting additional layers of compact formations below, or alternatively by successively lowering layers of the compact formations through at least one vertical mover, delivering additional layers of compact formation above.

The system may be completed by a palettizing unit including at least one pile rotation device configured for rotating at least one compact pile of tumbled bricks 90° around a horizontal axis, changing the orientation of the tumbled bricks of the pile, that is further placed on a pallet.

Additional features of the functional units referred to will appear in the detailed description with reference to drawings below.

The invention also concerns to a method for automatically grouping tumbled bricks, wherein the tumbled bricks have a prismatic rectangular configuration with two main faces, two side faces and two end faces, one of the two main faces or one of the two side faces of each tumbled brick being one featured side.

According to this invention the method comprises following steps:

providing at least one row of tumbled bricks in aligned succession in a longitudinal direction, with an even number of longitudinally spaced tumbled bricks with the featured side randomly positioned, all the tumbled bricks resting on one main face or on one side face thereof, detecting the position of the featured side of each tumbled brick of the row of tumbled bricks;

rotating each tumbled brick of the at least one row of tumbled bricks a preset angle selected in response of the detected position of the featured side of each tumbled brick, forming pairs of tumbled bricks with the corresponding featured sides facing each other or in opposition, and grouping all the pairs of rotated tumbled bricks in at least one compact formation in a single layer.

The method may further comprise piling successive layers of compact formations forming a compact pile of tumbled bricks.

The referred piling according to this invention may comprise compressing at least one compact formation of tumbled bricks in the longitudinal direction, successively elevating or lowering at least one layer of compact formation of tumbled bricks and positioning an additional layer of compact formation of tumbled bricks underneath the preceding elevated layers of compact formation of tumbled bricks or below the preceding lowered layers of compact formation of tumbled bricks, forming a compact pile of tumbled bricks.

Finally, and in order to place the formed compact pile of tumbled bricks on a pallet, it has been foreseen elevating said compact pile of tumbled bricks in a vertical direction, rotating by a palletizing unit the compact pile of tumbled bricks 90° around a horizontal axis, changing the orientation of the tumbled bricks of the compact pile, and further transferring the rotated compact pile of tumbled bricks over a pallet where it is further deposited.

It will be understood that references to geometric position, such as parallel, perpendicular, tangent, etc. allow deviations up to ±5° from the theoretical position defined by this nomenclature.

BRIEF DESCRIPTION OF THE FIGURES

The foregoing and other advantages and features of this invention will be more fully understood from the following detailed description of several embodiments with reference to the accompanying drawings, to be taken in an illustrative and non-limitative manner, in which:

FIGS. 6 and 7 schematically show two alternative embodiments for the building of the described piling unit.

Lastly FIGS. 8A and 8B schematically display the constituent elements of the pile rotation unit and its operation.

DETAILED DESCRIPTION

Figure 2:
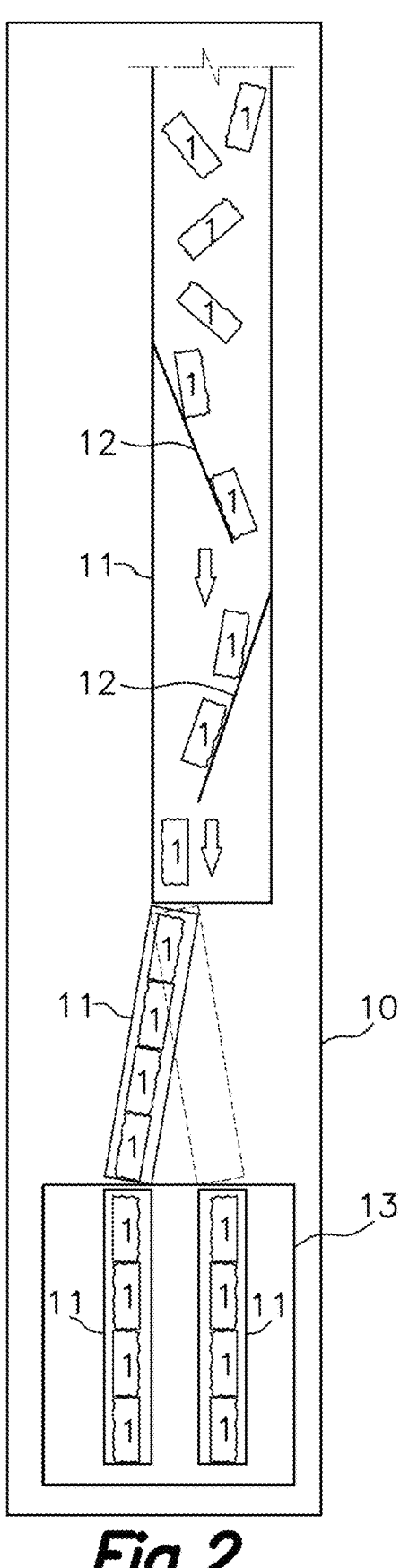
FIG. 2 shows schematically a possible embodiment of the above referred brick feeding unit.

The proposed system includes as know in the state of the art and as schematically depictured in FIG. 2 of the drawings a brick feeding unit 10 that comprises an arrangement of conveyors belts 11 receiving a stream of randomly arranged tumbled bricks 1, and equipped with a plurality of bar guides 12 obliquely oriented against the conveyance direction of the conveyor belts 11, the bar guides 12 being configured to tilt and direct the stream of randomly arranged tumbled bricks 1 into at least one stream of aligned tumbled bricks 1 all resting on one main face or on one side face thereof.

According to this invention the brick feeding unit 10 further comprises a buffer unit 13 configured to receive and accumulate the stream of aligned tumbled bricks 1 into one or several parallel rows of tumbled bricks 1, in aligned succession, the buffer unit 13 further comprising a spacer device configured to evenly space the tumbled bricks 1 of each row of tumbled bricks 1.

As previously indicated the tumbled bricks 1, have a prismatic rectangular configuration with two main faces, two side faces and two end faces, one of the two main faces or one of the two side faces of each tumbled brick being one featured side F.

Figure 1:
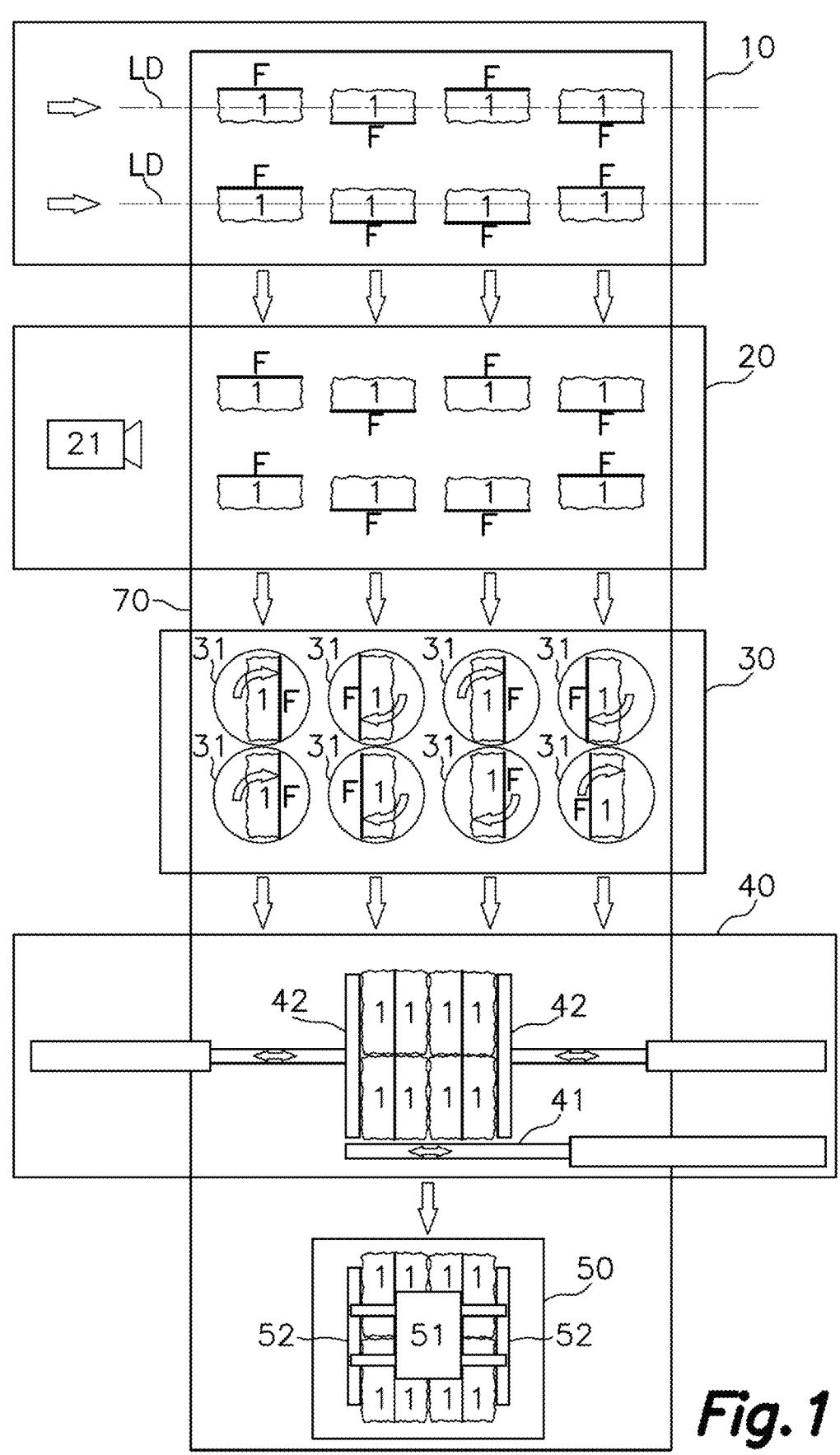
FIG. 1 is a schematic representation of the different functional units comprising the main elements of the proposed system.

As can be seen in the referred upper part of FIG. 1 the brick feeding unit 10 (FIG. 2) has been configured to provide at least one row of tumbled bricks 1 in aligned succession in a longitudinal direction LD, all the tumbled bricks 1 resting on one main face or on one side face thereof and each row of tumbled bricks 1 including an even number of longitudinally spaced tumbled bricks 1 with the featured side F randomly positioned.

The system according to this invention comprises:
- a detection unit 20 configured to automatically detect, e.g., by means of a camera 21, the position of the featured side F of each tumbled brick 1 of each row of tumbled bricks;
- a pairing unit 30 comprising a rotating device 31 for each tumbled brick 1 of the row of tumbled bricks configured to rotate each tumbled brick 1 a preset angle selected in response of the detected position of the featured side F of each tumbled brick 1, forming pairs of tumbled bricks 1 with the corresponding featured sides F facing each other or in opposition, and
- a grouping unit 40 configured for grouping all the pairs tumbled bricks in at least one compact formation in a single layer.

Figure 3:
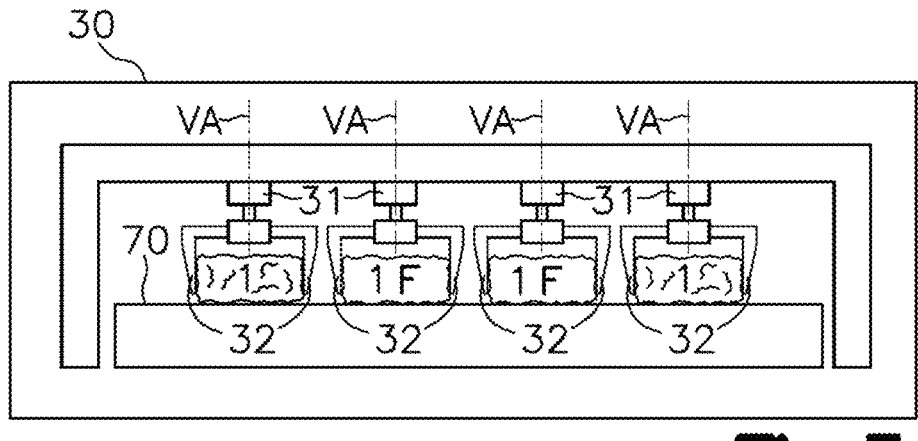
FIGS. 3 and 4 schematically illustrate in elevation, the features and operation of the rotating devices included in the pairing unit referred to above.
Figure 4:
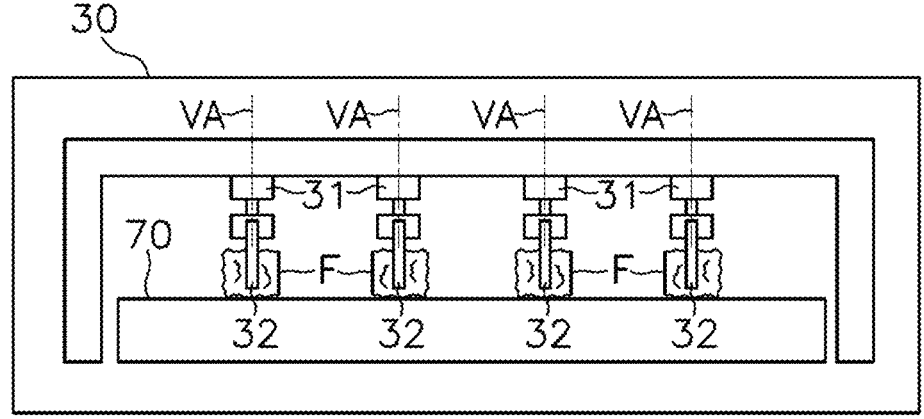
Figure 5:
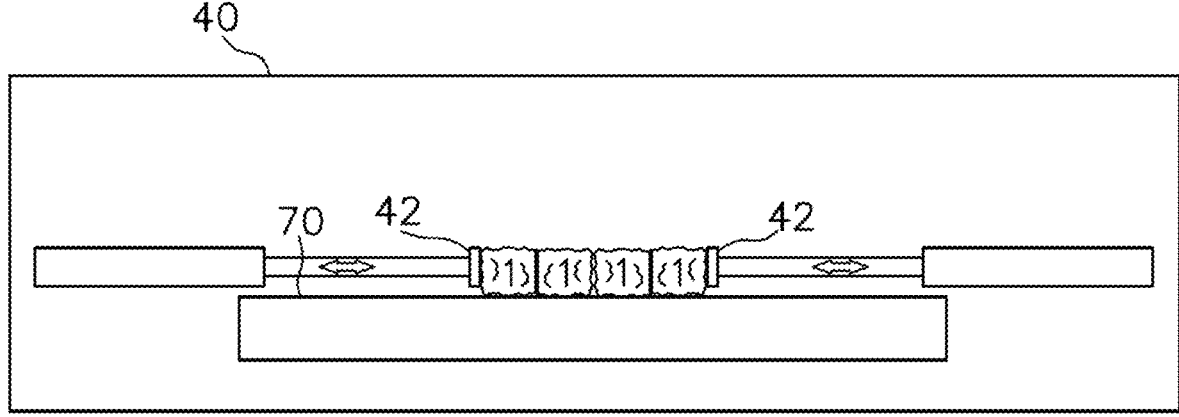
FIG. 5 illustrate in an elevation view the opposed pushed bars located on the sides of the pairing unit movable in a horizontal direction by an actuator to join the tumbled bricks already paired together (with the corresponding featured sides facing each other or in opposition) one against the others eliminating the spacing between them.

As shown in FIGS. 3 and 4 of the drawings each rotating device 31 is adapted to rotate around a vertical axis VA, and in the disclosed embodiment each rotating device 31 includes one gripping configuration 32 adapted for gripping one tumbled brick 1 and adapted to rotate around a vertical axis VA.

According to the embodiment schematically illustrated in FIGS. 1, 3 and 4, the at least one row of tumbled bricks 1 are a plurality of parallel rows of tumbled bricks, the pairing unit 30 comprising several parallel rows of rotating devices 31 forming an array of rotating devices 31, and the pairing unit 30 further comprises a conveyor band 70, underneath the rotating devices 31, configured to feed the array of rotating devices 31 with the plurality of parallel rows of tumbled bricks 1 transversally and longitudinally spaced forming an array of tumbled bricks 1, with vertical correspondence of each tumbled brick 1 with a corresponding rotating device 31, the conveyor band 70 being also configured to evacuate the paired tumbled bricks 1 from the pairing unit 30.

The conveyor band 70 is configured for, during the evacuation of the paired tumbled bricks 1, transversally pushing the paired tumbled bricks 1 against a stop 41 eliminating the transversal spacing, said conveyor band 70 and the stop 41 being part of the grouping unit 40.

As also illustrated in FIG. 1 the grouping unit 40 further comprises one or two opposed pusher bars 42 movable in a horizontal direction by an actuator and configured for pushing the pairs of tumbled bricks 1 with the corresponding featured sides F facing each other or in opposition, one against the others eliminating the spacing between them and providing the referred compact formations.

Although in FIG. 1 for illustrative purposes these pushing bars are drawn after the pairing unit 30, their arrangement will be preferably on the sides of the pairing unit 30 and be operational once the tumbled bricks have been paired as explained above.

As explained above the system further comprises a piling unit 50 to which the referred compact formations of tumbled bricks 1 are transferred by said conveyor band 70. The piling unit 50 has been configured for piling successive layers of compact formations forming a compact pile of tumbled bricks 1 by successively elevating layers of the compact formations through at least one vertical mover 51, inserting additional layers of compact formation below, as shown in the embodiment of FIG. 6, or alternatively by successively lowering layers of the compact formation through at least one vertical mover 51, delivering additional layers of compact formation above, as per the embodiment of FIG. 7.

In the proposed embodiment of FIG. 6 above referred, each vertical mover 51 comprises two opposed gripper plates 52 configured to laterally compress at least one compact formation of tumbled bricks 1 in a horizontal direction without interfering with an underneath side of the tumbled bricks 1 of the compact formation.

The proposed system may further comprise a palettizing unit 60 including one pile rotation device 61 configured for rotating one compact pile of tumbled bricks 1, 90° around a horizontal axis, changing the orientation of the tumbled bricks 1 of the pile in order to be later deposited over a pallet.

In the embodiment illustrated in FIGS. 8A and 8B, the pile rotation device 61 includes a pair of opposed gripper plates 62 adapted to compress the pile of tumbled bricks in a horizontal 5 direction, the pile rotation device 61 being configured to elevate said pile of tumbled bricks 1 in a vertical direction, and the pair of opposed gripper plates 62 being actively rotatable around an horizontal axis to rotate each pile of tumbled bricks 1 comprised in between.

As per the shown embodiment the pile rotation device 61 is mounted in a transfer unit 63 (for example a robotic arm) configured to place the pile of tumbled bricks 1 over a pallet where they are deposited.

What is claimed is:

1. A method for automatically grouping tumbled bricks, wherein the tumbled bricks have a prismatic rectangular configuration with two main faces, two side faces and two end faces, one of the two main faces or one of the two side faces of each tumbled brick being one featured side, the method comprising:

providing at least one row of tumbled bricks in aligned succession in a longitudinal direction, with an even number of longitudinally spaced tumbled bricks with the featured side randomly positioned, the tumbled bricks resting on one main face or on one side face thereof, detecting a position of the featured side of each tumbled brick of the row of tumbled bricks;

rotating each tumbled brick of the row of tumbled bricks a preset angle selected in response of the detected position of the featured side of each tumbled brick, forming pairs of tumbled bricks with the corresponding featured sides facing each other or in opposition, grouping the pairs of rotated tumbled bricks in at least one compact formation in a single layer; and piling successive layers of compact formations of tumbled bricks forming a compact pile of tumbled bricks.

2. The method, according to claim 1, wherein said piling comprises compressing at least one compact formation of tumbled bricks, successively elevating or lowering at least one layer of compact formation and positioning an additional layer of compact formation underneath the preceding elevated layers of compact formation or below the preceding lowered layers of compact formation, forming a compact pile of tumbled bricks.

3. The method, according to claim 1, further comprising elevating said compact pile of tumbled bricks in a vertical direction, rotating the compact pile of tumbled bricks 90° around a horizontal axis by a palletizing unit, changing the orientation of the tumbled bricks of the compact pile, and further transferring the rotated compact pile over a pallet where it is further deposited.

4. The method, according to claim 2, further comprising elevating said compact pile of tumbled bricks in a vertical direction, rotating the compact pile of tumbled bricks 90° around a horizontal axis by a palletizing unit, changing the orientation of the tumbled bricks of the compact pile, and further transferring the rotated compact pile over a pallet where it is further deposited.

\* \* \* \* \*